United States Patent [19]
Womack

[11] Patent Number: 5,639,191
[45] Date of Patent: Jun. 17, 1997

[54] SHORT COUPLED HYDRAULIC LEAD SCREW TAPPING APPARATUS

[76] Inventor: Robert C. Womack, 5119 Radbrook Pl., Dallas, Tex. 75220

[21] Appl. No.: 706,520

[22] Filed: Sep. 4, 1996

[51] Int. Cl.[6] ............................. B23B 35/00; B23G 1/18
[52] U.S. Cl. .............................. 408/1 R; 408/10; 408/14; 408/137; 470/181
[58] Field of Search .................. 408/1 R, 10, 11, 408/14, 124, 138, 137, 702; 470/181; 29/428, 890.11

[56] References Cited

U.S. PATENT DOCUMENTS

| | | | |
|---|---|---|---|
| 2,580,061 | 12/1951 | Adams | 408/11 |
| 2,784,267 | 3/1957 | Nackenhorst | 470/181 |
| 3,534,421 | 10/1970 | Fink | 408/137 |
| 3,690,782 | 9/1972 | Petroff | 408/137 |
| 3,838,934 | 10/1974 | Petroff | 408/137 |
| 4,050,835 | 9/1977 | Womack | 408/11 |

OTHER PUBLICATIONS

AAA Products International, Jiffy Products Division, Bulletin A-124, Revised Aug. 15, 1981.
AAA Products International, Jiffy Products Division, Bulletin A-167, Revised Jun. 1984.

Primary Examiner—Daniel W. Howell
Attorney, Agent, or Firm—John W. Montgomery

[57] ABSTRACT

A short coupled hydraulic tapping apparatus for heavy duty tapping operations including a compact, lightweight, hydraulic tool unit and a remote hydraulic power unit, with the entire apparatus being designed for portability. The tool unit includes a structural base having a slide-mounted high torque, low speed hydraulic motor with internal reduction gearing. The motor is slide mounted for directly driving a lead screw for rotation and longitudinal movement. The lead screw is supported by both the slide-mounted motor and a fixed lead nut. The slide or guideway has a length of travel substantially equal to the length of threads on the lead screw. Reversing and stop control devices control the forward tapping and retracting limits of movement. The design provides a lead screw having an internal bore for coaxially coupling with the motor drive shaft and having an internal coaxial receptacle for replaceably receiving a tapping tool. The remote hydraulic power unit includes a reservoir for hydraulic fluid, an electric motor driven hydraulic pump, a reversing valve and electric controls interconnected with the reversing and stopping control unit for operating the tool unit.

15 Claims, 3 Drawing Sheets

SHORT COUPLED HYDRAULIC LEAD SCREW TAPPING APPARATUS

TECHNICAL FIELD OF THE INVENTION

This invention relates to a portable heavy duty tapping apparatus; and more particularly to such apparatus including a compact, lightweight, lead screw tapping tool unit with integrally attached hydraulic motor, powered by a remote hydraulic power unit.

BACKGROUND OF THE INVENTION

For a number of years, a portable heavy duty tapping apparatus and system has been available which used a hydraulic motor to drive a lead screw tapping tool. One such prior tapping unit was the subject of U.S. Pat. No. 4,050,835, issued to Robert C. Womack. This unit functioned well, however, it required the inclusion of a splined spindle interconnecting between the hydraulic motor and the lead screw. The slidable spline spindle permitted the hydraulic motor to be rigidly mounted and allowed the lead screw and attached tapping tool to move into and out of the work piece, according to lineation caused by rotation of the lead screw. The inclusion of the spindle with the slidable hydraulic spline caused the unit to be elongated, required maintaining an overlapping interconnecting coupling between the spline shaft from the motor and the spline sleeve of the lead screw. Although the units functioned well and continued to function in many applications, a more compact, lighter weight and shorter tapping unit is sometimes needed, both for additional portability and also for reducing clearance required for tapping certain types of holes where exterior clearance (as with partially assembled machinery) was not available for the elongated hydraulic tapping tool which was available. In instances of large diameter tapping, the stroke of the machine was less than the length of the lead screw threads so that adequate overlapping of the splines was maintained to withstand the torque.

An object of this invention is to provide improved tapping apparatus for heavy duty tapping operations, which includes a compact lightweight tool unit with integrally attached hydraulic motor, which motor slides in the tool unit for short coupled movement with the tapping lead screw, the tool unit being powered from a remote hydraulic power unit.

Another object of this invention is to provide such apparatus which is compact and designed for ready portability and for ready set up at a job site location.

A further object of this invention is to provide such apparatus where the hydraulic motor is a low speed, high torque motor with internal gearing, for direct drive of the tool unit tapping lead screw without an interposed spindle.

Still another object of this invention is to provide such apparatus, including a heavy duty high torque tapping tool unit with a sliding motor, which is simple in construction and economic to manufacture.

A still further object of this invention is to provide such apparatus including a tool unit with a lead screw feed of the tap, and which is designed to prevent more than minimal damage to the tool unit in the event of control failure.

Another object of this invention is to provide such apparatus including a short coupled lightweight tool unit capable of tapping holes up to two inches in diameter.

A further object of this invention is to provide such apparatus including a tool unit adapted for use with a multiple tap head.

Still another object of this invention is to provide such apparatus including a lead screw tool unit designed for ready changeability of the lead screw and lead nut assembly for adapting the tool for use with taps of different leads.

It is another object to provide a durable lead screw tapping tool unit which has a stroke or depth of tapping capability which is substantially equal to the length of threads on the lead screw.

It is also an object to provide a lead screw tapping unit in which the lead screw itself provides an internal bore into which a motor drive shaft is coupled and also in internal receptacle into which the tapping tool is accepted so that minimum coupling length and tool length is achieved.

SUMMARY OF THE INVENTION

These objects are accomplished in an apparatus wherein the tool unit comprises a short coupled hydraulic tapping apparatus for heavy duty tapping operations including a compact, lightweight, hydraulic tool unit and a remote hydraulic power unit, with the entire apparatus being designed for portability. The tool unit includes a structural base having a slide-mounted high torque, low speed hydraulic motor with internal reduction gearing. The motor is slide mounted for directly driving a lead screw for rotation and longitudinal movement. The lead screw is supported by both the slide-mounted motor and a fixed lead nut. The slide or guideway has a length of travel substantially equal to the length of threads on the lead screw. Reversing and stop control devices control the forward tapping and retracting limits of movement. The design provides a lead screw having an internal bore for coaxially coupling with the motor drive shaft and having an internal coaxial receptacle for replaceably receiving a tapping tool. The remote hydraulic power unit includes a reservoir for hydraulic fluid, an electric motor driven hydraulic pump, a reversing valve and electric controls interconnected with the reversing and stopping control unit for operating the tool unit.

Preferably, the improved hydraulic tapping apparatus incorporates a unique tool unit which is lightweight, short and compact, yet has torque capability for the tapping of a single hole up to two inches in diameter or having torque capability for the tapping simultaneously of a plurality of smaller holes with a multiple tapping head. The apparatus is very short and portable, and particularly adapted for use in situations where the tapping tool is taken to a job site as opposed to the bringing of a job to a fabrication plant. Because of the short length, the unit can be used in some assembled or partially assembled apparatuses without a very large clearance area. Because of the compactness of the tool units, a plurality of tool units may be mounted in close proximity to each other to tap simultaneously a plurality of large sized holes, with the power unit being designed to have sufficient power to drive a predetermined number of the tool units at full torque capacity.

Particular features of the tool unit are that it is very simple in construction, short, accurate, powerful, rugged and safe. The tool unit is designed for automatic presetable control operation having automatic controls for reversing the tap feed at the end of the tapping stroke and shutting off the tool at the end of the cycle, with the internal parts of the tool unit being designed so that minimum damage to the tool will occur should the reversing or stop controls fail to function for any reason.

The tool unit is designed for automatic feeding and retracting of the lead screw which carries a tap; and the tool unit is designed for accurate indexing to a supporting jig or fixture, including a box slide or dovetail slide assembly whereby the tool unit may be moved to and from confronting relation with the work piece prior to operation of the tool tapping cycle. Such mounting may be desirable in certain instances; and the mounting structure is readily adapted for manually positioning the tool unit on its supporting slide, or for remotely positioning the tool unit relative to its supporting slide by means of an air cylinder or other remotely controllable reciprocating drive motor.

Because of its light weight and reduced size and its adaptability to preliminary feed by means of a mounting slide, the tool is readily adaptable for use in tapping areas on a work piece which are difficult to access.

Because of its convenient size and weight, and high torque capacity relative to size and weight, the tool unit is also readily adapted for use in fabrication operations on a production line wherein the work pieces are fed sequentially to a work station for successive operations, or wherein a number of operating tools are mounted on a rotary table for sequential operations on a work piece at a single work station. Because of the compact size, a plurality of tool units may be mounted side by side for simultaneous multiple tapping of large size holes, thereby performing in a single operation what would normally require several separate tapping operations. For smaller holes, efficiency can be achieved by a single tool unit driving a multiple tapping head, with the single tool unit having adequate torque for the multiple tapping operation and again performing, in a single operating step, what might otherwise require multiple operations.

A feature and advantage is the use of a low speed, high torque hydraulic motor in a tapping unit for the performing of many and varied heavy duty tapping functions, thereby enabling the performing of these functions with apparatus which is relatively inexpensive and therefore efficient in use, and representing efficiency from the standpoint of time and labor in that the apparatus is readily set up for many different operations.

Advantageously, according to the invention, the tapping machine provides full tapping torque for the entire length of the lead screw. Because there is no sliding spindle, large diameter tapping can be done without concern of damage to splines of the spindle when maximum depth is reached.

While the preferred embodiment of the invention has been illustrated and described, it will be understood by those skilled in the art that changes and modifications may be resorted to without departing from the spirit and scope of the invention.

The novel features and the advantages of the invention, as well as additional objects thereof, will be understood more fully from the following description when read in connection with the accompanying drawings.

BRIEF DESCRIPTION OF THE DRAWINGS

The foregoing objects, advantages, and features, as well as other objects and advantages, will become more apparent with reference to the description and drawings below, in which like numerals represent like elements and in which.

DETAILED DESCRIPTION OF THE PREFERRED EMBODIMENTS

Figure 1:
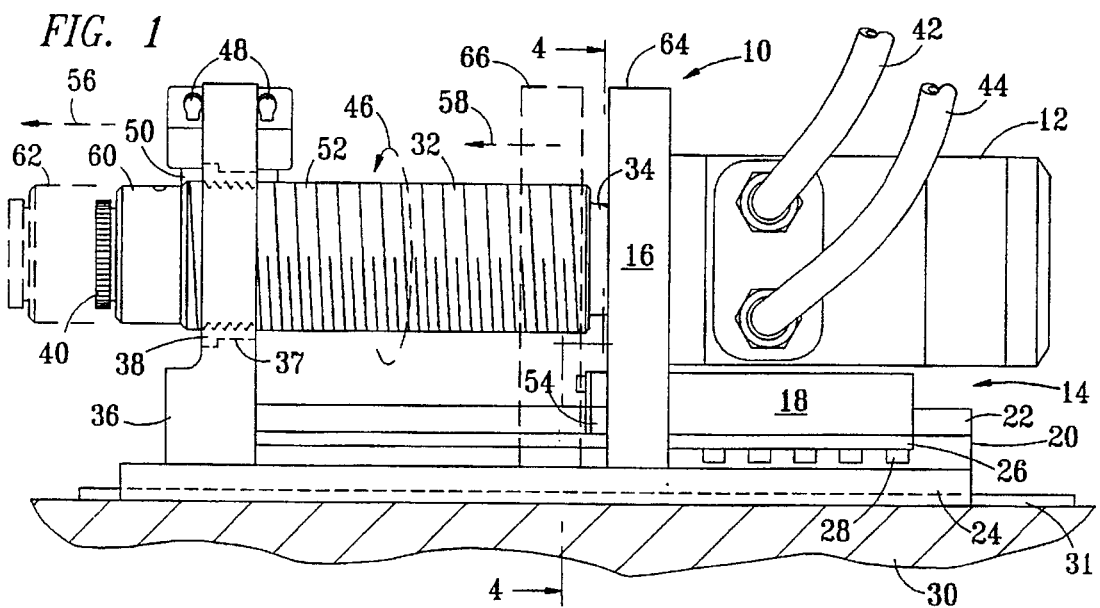
FIG. 1 is a side elevation view of a hydraulic tool unit according to the present invention.

FIG. 1 depicts a side elevation view of a hydraulic tool unit 10, according to one embodiment of the present invention. The tool unit 10 includes a hydraulic motor 12 which is slidably mounted, as at slide mount 14. Slide mount 14 generally includes a motor mounting plate 16 and a slide block 18. The slide block 18 slidably engages an elongated slide 20 which might be an interconnected V-channel; however, in the preferred embodiment includes a T-slide 22 which is conveniently coupled for sliding engagement to slide plate 18, as with connector plate 26 fastened as with threaded fasteners 28 horizontally along the slide block 18. The slide 20 is fastened to, or integrally formed with, a base 24. The base 24 may be supported with a support unit 30 which may include an indexing rib and groove 31 which may, for example, be a coacting rectangular groove or dovetail groove and rib 31. This indexing groove may allow the motor unit 10 to be quickly moved into and out of position for threading, as in a fixture arrangement for production machining.

Connected to the drive shaft of motor 12 is a lead screw 32 which is coupled for rotation by the motor, as at coupler 34 which will be described in greater detail with respect to FIG. 5 below. Lead screw 32 is thus supported for rotation with the shaft of motor 12 as through a bearing or bushing mounted in motor mounting plate 16. The lead screw is further supported in a horizontal parallel orientation, with respect to slide mount 30, with a fixed lead nut plate 36 which rigidly affixes and holds a lead nut 38 to attachment to the base 24. Advantageously, the lead screw is constructed to receive a threaded tap holder 40 by which a replaceable threaded tap (not shown) may be replaceably secured for rotation and lineation with the lead screw 32. The motor unit 12 is powered with a pair of hydraulic fluid lines 42 and 44 by which the motor may be driven in forward rotation, as indicated with rotation arrow 46, or may be reversed for rotation in the direction opposite arrow 46. The rotation of the lead screw 32 may be lubricated as with capped oil tubes 48 which supply lubricant to a felt wiper 50 which engages with threads 52 of lead screw 32. Felt wiper 50 rapidly conforms to the shape and maintains wiping contact with threads 52 to shield lead nut 38 from cutting chips and other debris, thereby maintaining smooth operation and facilitating long wear-free operation. Upon rotation of the lead screw 32 through the actuation of motor 12 in one direction, the lead screw moves as indicated with linear movement arrow 56 from a starting position 60 to a forward position 62 (shown in hidden lines). The linear motion of lead screw 32 also causes linear motion of slidable motor mount 14 so that motor mounting plate 16 moves linearly, as shown at arrow 58, from the initial position 64 to a forward position 66 (indicated in phantom lines). From this schematic depiction, those skilled in the art will recognize that motor 12 being rigidly mounted to plate 16 slides on slide mount 14 forward and maintains lead screw 32 in a parallel orientation for threading lead screw tapping, until such time as a desired tap depth is reached and the hydraulic power supply in lines 42 and 44 is reversed, thereby reversing rotation and retracting and reversing the linear motion to disengage the tapping mechanism.

Figure 2:
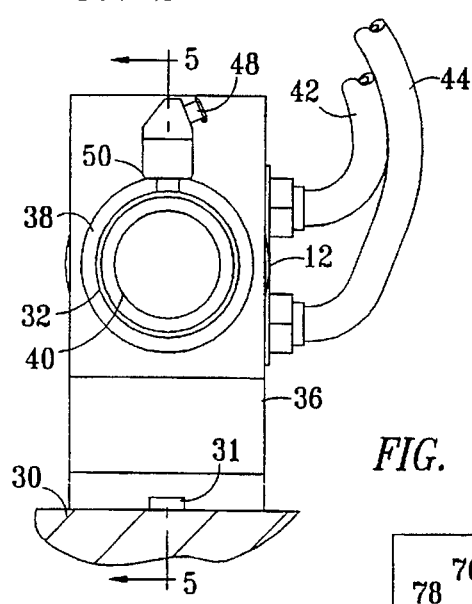
FIG. 2 is an end view of the hydraulic tool unit illustrated in FIG. 1.

With reference with FIG. 2 which is an end view of the hydraulic tool unit illustrated in FIG. 1, the arrangement of the lead screw is threadably engaged and centrally located in lead nut 38 so that the tap coupling bushing 40 is coaxial with the lead screw for rotation thereby. Also, the capped oil tube 48 and the thread shielding felt 50 is depicted. The rigid, or affixed, lead nut mounting plate 36 is fixed relative to base 24; however, the entire hydraulic tapping unit 10 may be conveniently indexed, attached and detached from a support base 30 using the index groove and rib 31.

Figure 3:
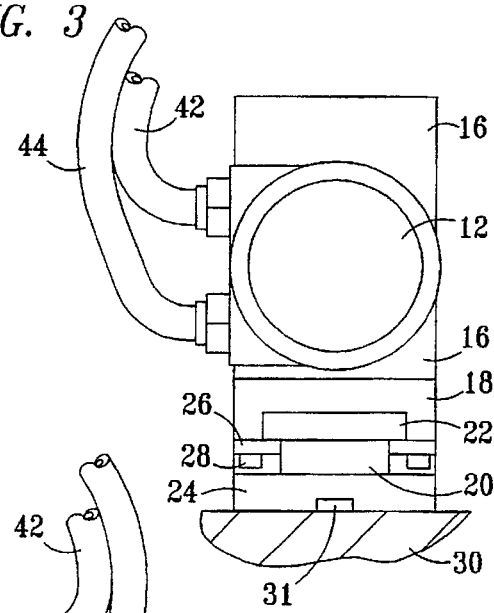
FIG. 3 is a rear view of the hydraulic tool unit of FIG. 1.
Figure 4:
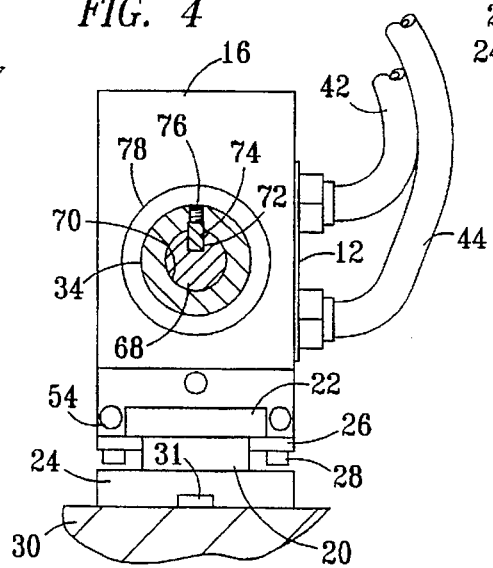
FIG. 4 is a transverse section view of the hydraulic tool unit of FIG. 1 taken in the plane 4—4 of FIG. 1.

FIG. 3 depicts the opposite end view from the front end view of FIG. 2 in which motor 12 and T-slide 22 affix to base 20 and may be more fully understood. Slide base 18 is conveniently fashioned out of plate stock having a groove formed therein so that the plate 18 may be secured for sliding engagement on T-slide 22, as with slide plates 26 fastened thereto with fasteners 28. In a preferred embodiment, the T-slide 22 is, and preferably all the slidably engaging surfaces of the slide mount 14, are coated with a thin, low friction TEFLON® base coating, as shown in FIG. 4. Even with a TEFLON® base coating, the slide surfaces are conveniently and advantageously wiped using a felt slide wiping unit 54. This advantageously shields the sliding surfaces from chips and debris which may result during tapping, and also in combination with the felt wiper 50 allows the tool unit 10 to be operated without an enclosure or without a housing enclosing the entire unit.

Figure 5:
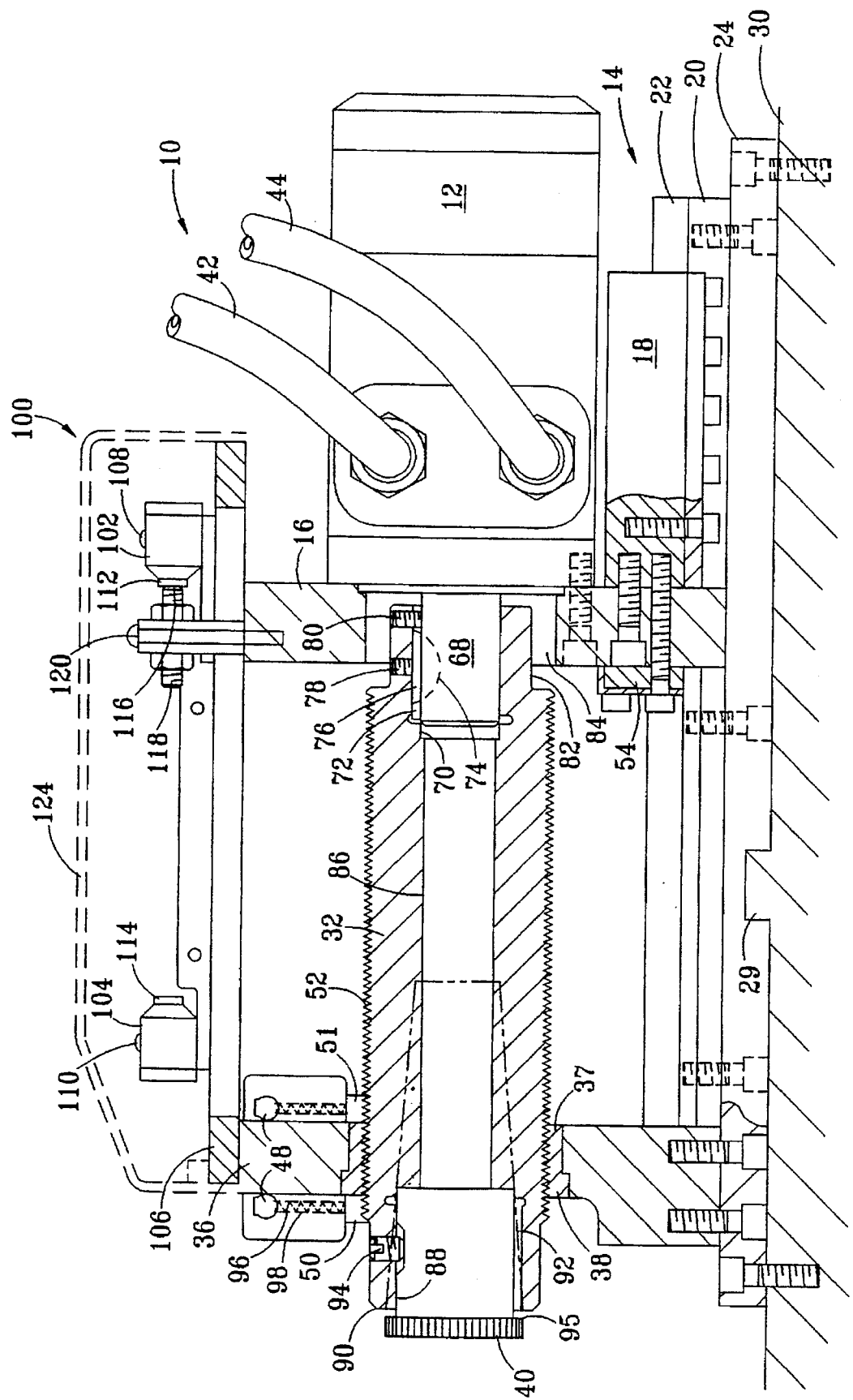
FIG. 5 is a side elevation view of the hydraulic tool unit of FIG. 1, partially broken away and with partial section along section line 5—5, showing derails of a control unit mounted on the tool unit and the combined components and construction of the tool unit.

Further with reference to the detailed partial cross-sectional view of FIG. 5 which is taken generally along a vertical cross-section line 5—5, as depicted in FIG. 2, the advantageous details of construction may be more fully understood. Motor 12 is slidably mounted as through mounting plate 16 and slide block 18, so that rotational motor shaft extends into the tool unit substantially parallel to slide guide 20. For convenient, repeatable location of the unit at a work site, a transverse rib and groove 29 also may be provided between support unit 30 and base 24. Uniquely, a bore 70 is formed in lead screw 32 for directly receiving in motor shaft 68 as part of an integrally formed coupler 34. Lead screw 32 is further coupled for rotation by drive shaft 68 through the use of key slot 72 formed adjacent bore 70 and a key groove 74 formed in shaft 68 with an interconnecting drive key 76 engaging between key slot 72 and key groove 74. In the preferred embodiment, the slot and groove are formed for accepting a woodruff key. Further to facilitate rigid engagement of the lead screw 32 with shaft 68 for longitudinal or linear movement one with the other a contact set screw 78 engages against the flat surface of woodruff key 76. Also advantageously to further ensure engagement and rigid connection between lead screw 32 and motor shaft 68, a blocking screw 80 is positioned through journal 82 for threaded engagement against the surface of motor shaft 68 immediately adjacent key 76. In the situation where key 76 is a woodruff key, any sliding movement of lead screw 32 in the disengagement direction from shaft 68 will cause woodruff key 76 to pivot or partially rotate within groove 74 so that it becomes wedged between lead screw 32 and shaft 68 thereby preventing disengagement.

The lead screw is supported for rotation with shaft 68 through the insertion of journal 82 into a correspondingly sized bearing 84 which is held in mounting plate 16. Lead screw 32 may be advantageously formed with a hollow center for maintaining maximum strength while reducing the weight. In one embodiment, the tapping end of lead screw is constructed with a tap receiving bore 88 which receives the tap engaging bushing 40. In the embodiment depicted in solid lines, tap engaging bushing 40 has a cylindrical surface 90 which is machine fit for removable engagement within bore 88. Upon insertion, a set screw 94 may be used to maintain tap engaging bushing 40 in position. This construction with the bushing inserted directly into the tapping end of lead screw 32, as with the insertion of motor shaft 68 into bore 70, provides for secure coupling while minimizing the length of the tool unit 10.

In an alternative embodiment depicted in phantom lines in FIG. 5, the tap engaging mechanism of lead screw 32 may be a tapered bore 92 sized for accepting a bushing or, alteratively, sized for accepting a standard sized taper such as a Morse taper or an ASA straight tap holder. To facilitate disengagement in such a tapered tap coupling, a ledge for prying, as with a screwdriver or a wedge tool, may be provided such as ledge 95 on bushing 40.

As discussed previously, lead screw felt wiper 50 is advantageously provided at least on the tapping side of lead nut 38 to lubricate and wipe machining chips as may result from the tapping operation. Further advantageously to avoid debris from entering lead nut 38, a thread-side wiper 51 is also provided. Each felt wiper 50 and 51 are provided with a lubricating mechanism such as oil caps 48, each of which communicates with a lubrication channel 98. Within lubrication channel 98 a spring 96 is advantageously provided to bias the felt wipers 50 and 51 against threads 52 of lead screw 32.

One distinct advantage of the use of a hydraulic motor is the ease with which it may be stopped and reversed and the durability of a hydraulic motor operated in repeated stop and reverse functions which is particularly characteristic of lead screw tapping. The tool unit 10 is, therefore, advantageously provided with a control unit 100 by which the direction of hydraulic fluid through tubes 42 and 44 may be reversed through a valve actuation mechanism. Particularly, adjustably positionable valve switches 102 and 104 are provided mounted to a base plate 106, which base plate 106 is rigidly fastened to lead screw support plate 36. Thus, each of the switches 102, the stop switch, and 104, the reversing switch, may be microswitches which are adjustably positionable as through threaded fasteners 108 and 110 along the base plate 106 of the control unit 100. Each switch 102 and 104 has a corresponding switch contact 112 and 114, which contacts are engageable by actuator contacts 116 and 118, respectively, which are adjustably positionable on a switch actuator boss 120. The switch actuator boss 120 is rigidly affixed to motor mounting plate 16 for longitudinal movement therewith. A channel 122 is formed within the bottom of base plate 106 of control unit 100 so that actuator boss 120 may move linearly a distance corresponding to the full stroke of lead screw 32. Thus, in operation, when the motor operates in a reverse direction, actuator contact 116 engages switch contact 112 and discontinues flow through hydraulic lines 42 and 44. When the tool unit is then activated, the valves are also placed in a reverse position for forward rotation thereby drawing lead screw 32 through lead nut 38 and causing the motor and slide mount 14 to move longitudinally with lead screw 32 as tapping is completed. When the actuator contact 118 contacts switch contact 114, the hydraulic valves (not shown) are actuated to a reverse position causing motor 12 to turn in the opposite direction thereby threadably disengaging the tap from the hole which has just been tapped. Again, when actuator contact 116, moving with motor mount plate 16 contacts switch contact 112, the valves are placed in a "stop flow" position until the operator again reactivates the tool for forward direction rotation.

Figure 6:
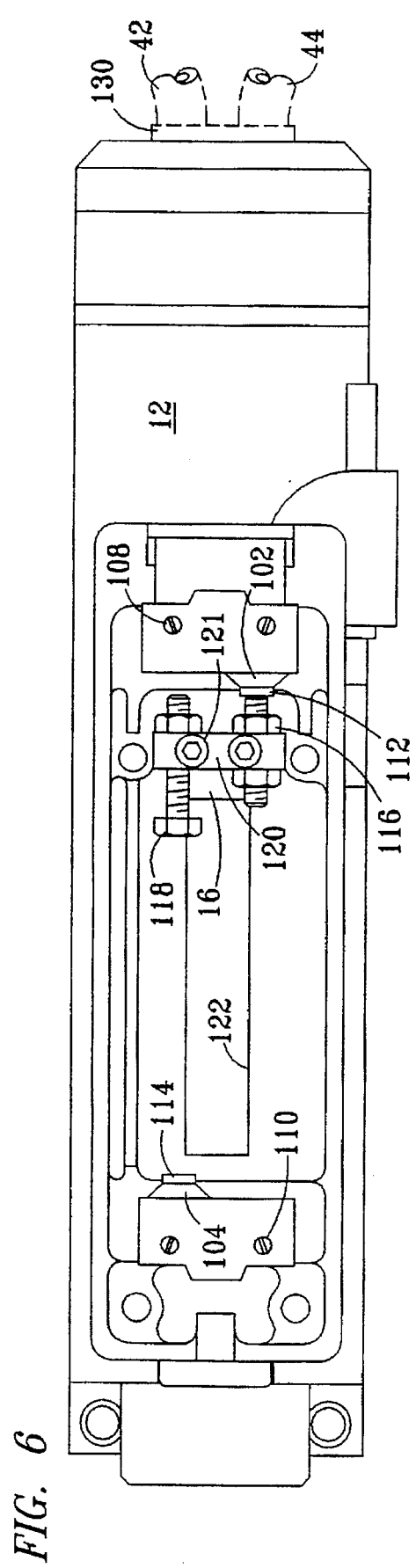
FIG. 6 is a top plan view of the hydraulic tool unit with a control unit mounted on the top thereof, as in FIG. 5, without its cover.

FIG. 6, which is a schematic top view of the control unit 100 mounted on tool unit 10, details construction of the control unit 100 with the cover plate 124 removed. In particular, it will be noted that the actuator boss 120 is generally T-shaped with actuator contacts 116 and 118 on opposite sides, catercorner across the actuator boss 120. This permits convenient separate adjustment of the position of actuator contact 116 and actuator contact 118. Thus, not being collinear, they need not be adjusted with the same mechanism and the construction is simple, light weight and compact.

By way of example of size and capacity, such a tool unit 10 carrying a six horse power (6 h.p.) hydraulic motor may weigh in the range of 15 to 20 pounds, where the control unit cover is fabricated of die cast aluminum and where other parts are fabricated from steel or suitable materials. For this tool unit, the overall length of the unit, including the motor, may be about twelve inches (12 inches) with side-to-side dimensions being about three-and-one-fourth inches (3¼ inches) and top to bottom dimension of about eight-and-eleven-sixteenths inches (8¹¹⁄₁₆, inches). The hydraulic motor being generally cylindrical in configuration may have an outer diameter of about three-and-one-fourth inches (3¼ inches). It will be seen then that the tool unit may be quite short and also quite slim with the control unit cover 100 presenting a protrusion at the top only. The compact size, and particularly the use of a back port motor (as depicted with phantom line at 130 of FIG. 6), permits close side-by-side ganging of a plurality of units for tapping a plurality of closely spaced large diameter holes simultaneously. Also, a custom-built tool unit may be shortened further by shortening the slide guideway and the lead screw to the exact depth of a particular tapping operation.

The motor 12 is preferably a high torque, low speed motor unit having built-in gear reduction, wherein the motor is used in direct drive with the lead screw 32 to produce rotation speeds of about 25 to about 900 rpm; and wherein the tool unit is capable of tapping operations employing one-fourth to two-inch diameter taps. If desired, the output speed of the lead screw can be further reduced by throttling the flow of hydraulic fluid to the hydraulic motor.

The construction is shown with recesses accommodating cap screws for securing the motor 12 into the slide mount 14 in axial alignment with the slide guide 22, with the motor drive shaft 68 projecting into a bore formed in one end of the lead screw 32 and coinciding with the longitudinal central axis of the lead screw. The fixed lead nut mount plate 36 is secured to the base plate by means of suitable cap screws threaded through suitable counterbores in the lead nut mount plate and into the base plate. This fixed lead nut mount is provided with a bore and a counterbore and defines a housing for receiving an internally threaded bronze bushing 38 which functions as the lead nut 38 for the tool unit 10 as described. The lead nut 38 is seated within the housing counterbore 37 with an interference fit; and is further retained in this housing by means of one-fourth inch allen wrench shear screws threaded into tap holes provided on the face of the fixed lead nut mount plate, with the tapped holes being drilled and tapped into the joint between the bore and the lead nut. This mounting provides for separation of the lead nut from the mounting plate in the event of inadvertent jamming or malfunction of the shutoff and reverse switches.

OPERATION

The operation of the tapping apparatus will now be described in connection with hydraulic and electric circuits and components.

A pump driven by an electric motor withdraws hydraulic fluid from a reservoir through a strainer and directs pressurized fluid to a four-way hydraulic valve which controls the flow of fluid to and from the hydraulic motor 12 through the hoses 42 and 44. The four-way hydraulic valve is preferably a double solenoid actuated spring centered three-position valve controlled by an electric control circuit. In the operation of the apparatus, the hydraulic pump is operated continuously; and in the center position of the valve, the circulating fluid is bypassed through the valve to the reservoir through a filter, and is not directed to the motor 12. This hydraulic system also includes a bypass relief valve for bypassing fluid to the reservoir to limit the torque applied to small taps for preventing tap breakage and to reduce damage in the event of system malfunction. The four-way valve includes a feed solenoid and a retract solenoid which function respectively to shift the valve from the feed and retract strokes of the lead screw.

The control circuitry (not shown), with the exception of the reversing and shutoff switches 104 and 102, respectively, may be mounted in a separate housing along with the four-way hydraulic valve. This circuit includes a power supply which, in a preferred embodiment, includes a transformer for converting 110 volts, 220 volts or 440 volts single phase AC power to a 24 volts DC control system through a diode bridge rectifier.

A feed solenoid coil is connected in parallel with a coil of an electric feed relay which includes associated normally open contacts. The normally open contacts, and also other normally closed contacts, are connected in series with each other, and in parallel with a normally open push button start switch. This last described parallel circuit is connected in series with the parallel circuit of the feed solenoid coil and electric feed relay coil.

To initiate the feed stroke, the start switch is closed and this energizes both the feed solenoid and the feed relay to close the normally open relay contacts. The feed solenoid and the feed relay are then maintained energized through the circuit, including the normally open contacts and the normally closed contacts. The four-way hydraulic valve then shifts to the feed condition and is maintained in this condition until the feed solenoid coil is deenergized.

The return circuit includes another feed solenoid and another relay coil of an electric retract relay which are connected in parallel; also another set of normally open relay contacts and also another set of normally closed relay contacts are associated with the electric retract relay. The control circuit for these coils includes a parallel circuit consisting of the normally open relay contact and the normally open reversing switch 104, which parallel circuit is connected in series with the parallel circuit of the solenoid and coil. The shutoff switch 102 is connected in series with the parallel circuit of the normally open retract contacts and with reversing switch 104; and this shutoff switch, while electrically connected as normally closed is normally held in the open condition, as by an actuator of the control carriage, when the tool unit is in the rest condition. As soon as the feed movement of the lead screw begins, this shutoff switch closes.

The retract cycle begins when the lead screw reaches its forward limit and the reversing switch 104 is engaged and closed momentarily by its actuator 118. Since the shutoff switch 102 is then closed, the retract solenoid and retract relay are energized through the series connected reversing and shutoff switches; and this affects closing of the normally open relay contacts and the opening of the normally closed relay contacts. The opening of the normally closed relay contacts deenergizes both the feed solenoid and the feed relay. Simultaneously, the energizing of the retract solenoid affects shifting of the four-way valve to reverse the hydraulic motor and effect retraction of the lead screw; and the retract solenoid and retract relay coil are maintained energized through the series connected normally open relay contacts and shutoff switch 102. The reversing switch will, of course, again open as soon as actuator 118 retracts from the reversing switch 104 and actuator 116 moves to shutoff switch 102. At the limit of the retracting movement of the lead screw 32, the shutoff switch 102 is opened by the associated actuator 116 to deenergize the retract solenoid and the retract relay. The four-way valve is then returned to its center position by its centering springs and the tool unit 10 is back at a rest condition for initiation of a succeeding tap cycle.

An additional circuit feature (not shown) may be an emergency retract switch, which is a normally open push button switch, connected in series with the parallel connected retract solenoid and the retract relay. The closing of this switch manually immediately initiates the retract cycle, regardless of the position of the lead screw, controlling the circuit in the same manner as the reversing switch 104. Another advantageous feature of the circuit may be a jog feed switch, which is a normally open push button switch. This switch energizes the feed solenoid when it is closed and the switch includes associates contacts which remove the feed relay from the circuit for this operation. This jog feed switch is used for setting up the tapping depth of the tool unit.

The tool unit has certain safety features built into it which prevent damage to the tool unit in the event of failure of the controlling microswitches. The limit of feed movement of the lead screw and the control carriage is, of course, determined by the physical dimensions. It will be seen that the reversing switch 104 is engaged by the adjustable actuator 118 before the physical limits are reached. It will also be seen that, at the moment of engagement of reversing switch 104, the trailing end of the threads on the lead screw are about to terminate. The parts of the tool unit are actually dimensioned so that this termination will occur before the lead screw reaches its forward limit. In the event of failure of the reversing switch 104, the actuator 118 would likely displace the switch 104 from its pedestal, but further advance of the lead screw would cease before any serious damage was done to the structural parts. This safety feature would also come into play should the reversing switch be overridden either deliberately or through some careless or unintentional operation of the tool unit.

In regard to mounting the tool unit 10, the indexing groove 31 provides means for accurately indexing the tool unit relative to permanent support jigs or fixtures 30. Such a mounting may be desired where it is necessary to move the tool unit 10 relative to the work piece in order for proper positioning of a drilled hole to be tapped. In production operation, the entire tool unit 10 may, for example, be moved into and out of position with a double acting air or hydraulic feed cylinder (not shown) appropriately mounted to make this advancing and retracting of the tool into appropriate position a remote operation. Alternatively, the tool unit may be moved manually; and the tool unit may be retained against reverse movement by means of a suitable retaining mechanism such as a threaded fastener or a pin dropped into suitable aperture in the base and support structure 30.

Desirably, quick disconnect hydraulic hoses and electric conduits may be provided for coupling the tool unit to one or more power units.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A hydraulic tapping apparatus comprising:
   a. a tool unit having a motor end and a tap end, said tool unit having a slide mount;
   b. a reversible hydraulic motor slidably mounted on said slide mount for sliding therealong, said reversible hydraulic motor having a motor drive shaft extending axially parallel to said slide mount;
   c. a lead nut non-rotatably mounted at said tap end of said tool unit;
   d. a lead screw, having threads therealong, coupled to said motor drive shaft for rotation therewith and threadably engaged with said lead nut, said lead screw positioned intermediate said motor end and said tap end and having a tap mounting device at said tap end of said lead screw;
   e. said lead nut and said motor drive shaft supporting said lead screw for rotation and for linear movement of said lead screw upon rotation within said lead nut so that said reversible hydraulic motor, which is coupled to said lead screw, also moves linearly along said slide mount upon linear movement of said lead screw; and
   f. a control unit including a reversing control device and stop control device mounted in longitudinally spaced relation on said tool unit, and adjustable actuators connected to said slide-mounted motor for linear movement with said lead screw and with said hydraulic motor, and which actuators are positioned for engaging and actuating said reversing and stop control devices.

2. The hydraulic tapping apparatus of claim 1 wherein said lead screw has a bore formed therein extending coaxially therewith and projecting at least partially under said threads, said bore sized for receiving said motor drive shaft and by which said motor drive shaft is coupled to said lead screw.

3. The hydraulic tapping apparatus of claim 1 wherein said tap mounting device of said lead screw comprises a hollow portion at said tap end of said lead screw extending at least partially beneath said thread of said lead screw by which a tapping device is replaceably engaged with said lead screw.

4. The hydraulic tapping apparatus of claim 1 wherein said reversing control device of said control unit is selectably positionable for setting a desired distance to which the lead screw will move in a forward tapping direction before reversing; said stop control device is selectably positionable for establishing the position at which the tap will be stopped upon retraction from forward tapping operation; and said adjustable actuators comprise two separate adjustment screws, one positioned for engagement with said reversing control device and another positioned for engagement with said stop control device, both of which adjustable actuators are connected to a single actuator boss which is rigidly fastened to a portion of said slide mount which moves linearly with said motor and said lead screw.

5. The hydraulic tapping apparatus of claim 1 wherein said slide mount further comprises:
   a. a guideway having a plurality of smooth parallel sliding surfaces extending from said motor end of said tool unit to said tap end thereof;
   b. a slide block having a plurality of smooth sliding surfaces slidably engaged with said plurality of smooth guideway surfaces; and c. a motor mounting plate rigidly affixed to said slide block by which said motor is mounted so that said motor drive shaft is parallel to said guideway for parallel linear movement therealong.

6. The hydraulic tapping apparatus of claim 5 wherein:
   a. said plurality of parallel sliding surfaces of said guideway define a T-shaped cross section in a direction transverse to said sliding surfaces of said guideway; and
   b. wherein said plurality of smooth sliding surfaces of said slide block define a concave rectangular C-shaped cross section sized for corresponding sliding engagement along said T-shaped guideway.

7. The hydraulic tapping apparatus of claim 6 wherein said T-shaped guideway is constructed of a horizontal rectangular plate of steel having a predetermined side-to-side dimension and rigidly fastened to a second rectangular plate of steel having a second predetermined side-to-side dimension which is more narrow than said first horizontal plate of steel thereby forming the vertical base of said T-shaped cross section; and said slide block is constructed from a rectangular block of steel with horizontal parallel side rails rigidly fastened therealong and with retaining plates rigidly fastened to said side rails extending horizontally inward for retaining engagement with said horizontal rectangular plate of said T-shaped guideway.

8. The hydraulic tapping apparatus of claim 5 wherein at least one of said guideways or said slide blocks, slidably engaged with said guideway, comprise an antifriction TEFLON® coated slide surface.

9. The hydraulic tapping apparatus of claim 5 further comprising a felt wiper mounted to said slide block in slidable engagement with said plurality of smooth sliding surfaces of said guideway, so that debris is wiped from said smooth sliding surfaces upon linear movement of said slide block therealong, thereby facilitating smooth and low wear, friction free sliding movement.

10. The hydraulic tapping apparatus of claim 1 further comprising:
    a. a first lubricated felt wiper attached to said tool unit in wiping engagement with said threads of said lead screw at the tap end side of said lead nut; and
    b. a second lubricated felt wiper attached to said tool unit for wiping engagement with said threads of said lead screw adjacent the motor end side of said lead nut.

11. The hydraulic tapping apparatus of claim 1 further comprising:
    a. a bore formed in said lead screw at said motor end thereof and extending coaxially thereinto, at least partially under said threads of said lead screw, said bore sized for receiving said motor drive shaft thereinto;
    b. a key slot formed in a surface of said bore of said lead screw;
    c. a woodruff key groove formed in said motor drive shaft;
    d. a woodruff key engaged between said key slot in said bore and said woodruff key groove of said motor drive shaft; and
    e. a blocking set screw radially projecting through said lead screw into said key way of said bore therein at a position immediately adjacent to said woodruff key toward the motor end of said lead screw so that, upon relative linear movement between said lead screw and said motor drive shaft, said woodruff key is pivoted into wedged blocking engagement thereby preventing disengagement of said lead screw from said motor drive shaft.

12. The hydraulic tapping apparatus of claim 1 wherein said tap mounting device at one end of said lead screw comprises a tap receiving bore having a cylindrical surface for receiving a corresponding cylindrical tap engaging bushing.

13. The hydraulic tapping apparatus of claim 1 wherein said tap mounting device comprises a tapered bore formed in the tap end of said lead screw, and projecting thereinto at least partially under said threads of said lead screw for receiving a tapping tool with a tapered shaft in direct short coupled tap driving engagement.

14. A hydraulic tapping tool unit comprising:
   a. a base plate;
   b. a guideway formed along said base plate;
   c. a motor slide mount for linear movement slidably engaged along said guideway;
   d. a reversible hydraulic motor with a rotatable drive shaft mounted on said slide block with said drive shaft parallel to said guideway;
   e. a lead screw coaxially engaged over said drive shaft for rotation with said hydraulic motor and for linear movement therewith;
   f. a lead nut non-rotatably mounted to said base plate at a position for threadably engaging with said lead screw so that rotation of said lead screw within said lead nut simultaneously drives said lead screw, said motor and said slide block linearly along said guideway;
   g. a tap mounting device formed in an end of said lead screw opposite from said motor shaft for receiving a tapping tool in coaxial alignment and for rotation and lineation with said lead screw;
   h. a hydraulic power source connected to said hydraulic motor; and
   l. a control unit for controlling the hydraulic power source to said motor so that forward tapping rotation, reverse tapping rotation and stopping of said motor is controlled thereby.

15. A method of constructing a hydraulic tapping apparatus comprising the steps of:
   a. providing a tool unit having a motor end and a tap end, said tool unit provided with a slide mount;
   b. slidably mounting a reversible hydraulic motor on said slide mount for sliding therealong;
   c. providing said reversible hydraulic motor with a motor drive shaft extending axially parallel to said slide mount;
   d. coupling a lead screw to said motor drive shaft for coaxial rotation and linear movement with said motor shaft;
   e. providing said lead screw with a tap receiving mounting device at an end opposite from said motor coupling end;
   f. rigidly mounting a lead nut at the tap end of the tool unit for threadably receiving said lead screw so that rotation of said lead screw by said motor causes linear movement of said lead screw;
   g. providing a control unit for reversing tapping rotation and for stopping rotation upon; and
   h. providing adjustable actuators selectably positionable in a spaced relation to said guideway for actuating said control unit to reverse the direction of rotation upon contact and for actuating said control device to stop rotation upon contact at separately selected positions for said actuators.

* * * * *